(12) United States Patent
Watanabe

(10) Patent No.: US 11,248,699 B2
(45) Date of Patent: Feb. 15, 2022

(54) CONTROL APPARATUS

(71) Applicant: HONDA MOTOR CO., LTD., Tokyo (JP)

(72) Inventor: Takahide Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/182,369

(22) Filed: Feb. 23, 2021

(65) Prior Publication Data

US 2021/0270365 A1 Sep. 2, 2021

(30) Foreign Application Priority Data

Feb. 28, 2020 (JP) .............................. JP2020-033728

(51) Int. Cl.
*F16H 59/70* (2006.01)
*F16H 63/30* (2006.01)
*F16H 63/36* (2006.01)

(52) U.S. Cl.
CPC ......... *F16H 63/3026* (2013.01); *F16H 59/70* (2013.01); *F16H 63/36* (2013.01)

(58) Field of Classification Search
CPC ....... F16H 63/3026; F16H 59/70; F16H 63/36
See application file for complete search history.

(56) References Cited

U.S. PATENT DOCUMENTS

| | | | |
|---|---|---|---|
| 2016/0319915 A1* | 11/2016 | Ishikawa | F16H 3/66 |
| 2016/0319931 A1* | 11/2016 | Ishikawa | F16H 3/66 |
| 2016/0363216 A1* | 12/2016 | Tachibanada | F16H 3/66 |

FOREIGN PATENT DOCUMENTS

JP    6116511 B2    4/2017

* cited by examiner

*Primary Examiner* — David J Hlavka
(74) *Attorney, Agent, or Firm* — Westerman, Hattori, Daniels & Adrian, LLP

(57) ABSTRACT

An apparatus of an automatic transmission includes a control unit controlling engagement and release of engaging mechanisms. One of the engaging mechanisms is a mechanical engaging mechanism which can be switched to a first state and a second state in which rotation of a rotational element in both directions is restricted. In a reverse range, the mechanical engaging mechanism is set in the second state. If a shift range is switched to the reverse range when the mechanical engaging mechanism is in the first state, the control unit starts engagement corresponding to the reverse range after executing preparation processing. If the shift range is switched from the reverse range to a forward range in the preparation processing, the control unit establishes a forward gear range by controlling the engaging mechanisms according to a degree of progress of the preparation processing.

6 Claims, 9 Drawing Sheets

FIG. 2A

|      | C1 | C2 | C3 | B1 | B2  | B3 | F1   | GEAR RATIO |
|------|----|----|----|----|-----|----|------|------------|
| RVS  |    |    | ○  |    | ○   |    | ○    | 4.008      |
| 1st  |    |    |    | ○  | (○) |    | △    | 5.233      |
| 2nd  |    | ○  |    | ○  | ○   |    | (△)  | 3.367      |
| 3rd  |    |    | ○  | ○  | ○   |    | (△)  | 2.298      |
| 4th  |    | ○  | ○  | ○  |     |    | (△)  | 1.705      |
| 5th  | ○  |    | (○)| ○  |     |    | (△)  | 1.363      |
| 6th  | ○  | ○  | ○  |    |     |    | (△)  | 1.000      |
| 7th  | ○  |    | ○  |    | ○   |    | (△)  | 0.786      |
| 8th  | ○  | ○  |    |    | ○   |    | (△)  | 0.657      |
| 9th  | ○  |    |    |    | ○   | ○  | (△)  | 0.584      |
| 10th | ○  | ○  |    |    |     | ○  | (△)  | 0.520      |
| P/N  |    |    |    |    |     |    | △/○  | —          |
| RPM  | ○  |    | ○  |    |     | ○  | △→○  | —          |

FIG. 2B

| PLANETARY GEAR MECHANISM | GEAR RATIO |
|--------------------------|------------|
| P1                       | 2.681      |
| P2                       | 1.914      |
| P3                       | 1.614      |
| P4                       | 2.734      |

FIG. 5

| STEP | ENGAGING OPERATION | | | | | | | TRANSITION CONDITION |
|---|---|---|---|---|---|---|---|---|
| | B3 | B2 | B1 | C3 | C2 | C1 | F1 | |
| 1 | — | ↓ | ↓ | — | — | — | △ | RELEASE IS COMPLETED |
| 2 | ○ | — | — | ○ | — | ○ | △ | INPUT SHAFT ROTATION SPEED ≈ 0 ENGAGEMENT OF C1 IS COMPLETED, OR THE LIKE |
| 3 | ○ | — | — | ○ | — | ○ | ○ | F1 SWITCHING IS COMPLETED |
| 4 | ↓ | ○ | — | ○ | — | ↓ | ○ | |

↓ : DURING RELEASING    ○ : ENGAGEMENT    — : RELEASE    F1/△ : ONE-WAY ROTATION PERMISSION    F1/○ : ROTATION INHIBITION

CONTROL APPARATUS

CROSS-REFERENCE TO RELATED APPLICATION(S)

This application claims priority to and the benefit of Japanese Patent Application No. 2020-033728 filed on Feb. 28, 2020, the entire disclosure of which is incorporated herein by reference.

BACKGROUND OF THE INVENTION

Field of the Invention

The present invention relates to a control apparatus of an automatic transmission.

Description of the Related Art

There is known an automatic transmission that includes planetary gear mechanisms and engaging mechanisms such as a clutch and a brake, and establishes each gear range by switching the power transmission path by the engaging mechanisms. As the engaging mechanisms, employing a mechanical engaging mechanism has been proposed in addition to a hydraulic engaging mechanism. In particular, an arrangement that uses a clutch (two-way clutch) capable of switching to a state to do two-way rotation restriction as a brake has been proposed.

When the two-way clutch is used as a brake, a rotational element connected to the two-way clutch can be switched between a state in which rotation is restricted only in one direction (rotation in the reverse direction is permitted) and a state in which rotation is restricted in both directions. When switched to the state in which rotation is restricted in both directions, the rotational element connected to the two-way clutch is fixed to the casing. For this reason, if switching is done during rotation of the rotational element, unusual noise or vibration occurs, and the two-way clutch breaks. To prevent this, there has been proposed that after executing preparation processing of stopping rotation of the rotational element, switching is performed (Japanese Patent No. 6116511).

However, the shift range may be switched during the preparation processing. It is desirable to be able to immediately cope with this switching, but unusual noise or vibration may be generated.

SUMMARY OF THE INVENTION

It is an object of the present invention to provide a control apparatus of an automatic transmission that can cope with switching of the shift range during preparation processing.

According to an aspect of the present invention, there is provided a control apparatus of an automatic transmission, wherein the automatic transmission includes: an input shaft to which a driving force is input from a driving source through a torque converter; an output member; a plurality of planetary gear mechanisms configured to transmit the driving force input to the input shaft to the output member; and a plurality of engaging mechanisms capable of establishing a plurality of gear ranges by switching a transmission path of the driving force in the plurality of planetary gear mechanisms, one of the plurality of engaging mechanisms is a mechanical engaging mechanism functioning as a brake, the mechanical engaging mechanism can be switched to a first state in which rotation of a predetermined rotational element only in a first direction is permitted and a second state in which rotation of the predetermined rotational element in both the first direction and a second direction reverse to the first direction is restricted, in a reverse range, the mechanical engaging mechanism is set in the second state, the control apparatus comprises a control unit configured to control engagement and release of the plurality of engaging mechanisms, if a shift range is switched to the reverse range when the mechanical engaging mechanism is in the first state, the control unit starts engagement of the engaging mechanism corresponding to the reverse range after executing preparation processing, the preparation processing is processing of switching the mechanical engaging mechanism from the first state to the second state via an engaging combination which connects the predetermined rotational element to the input shaft to stop rotation of the input shaft, and if the shift range is switched from the reverse range to a forward range in the middle of the preparation processing, the control unit establishes a predetermined forward gear range by controlling the plurality engaging mechanisms following a procedure that differs depending on a degree of progress of the preparation processing.

Further features of the present invention will become apparent from the following description of exemplary embodiments (with reference to the attached drawings).

BRIEF DESCRIPTION OF THE DRAWINGS

FIG. 2A is a view showing an example of the engagement table of engaging mechanisms;

FIG. 2B is a view showing the gear ratios of planetary gear mechanisms;

FIG. 5 is a schematic explanatory view of processing when selecting a reverse range;

DESCRIPTION OF THE EMBODIMENTS

Figure 1:
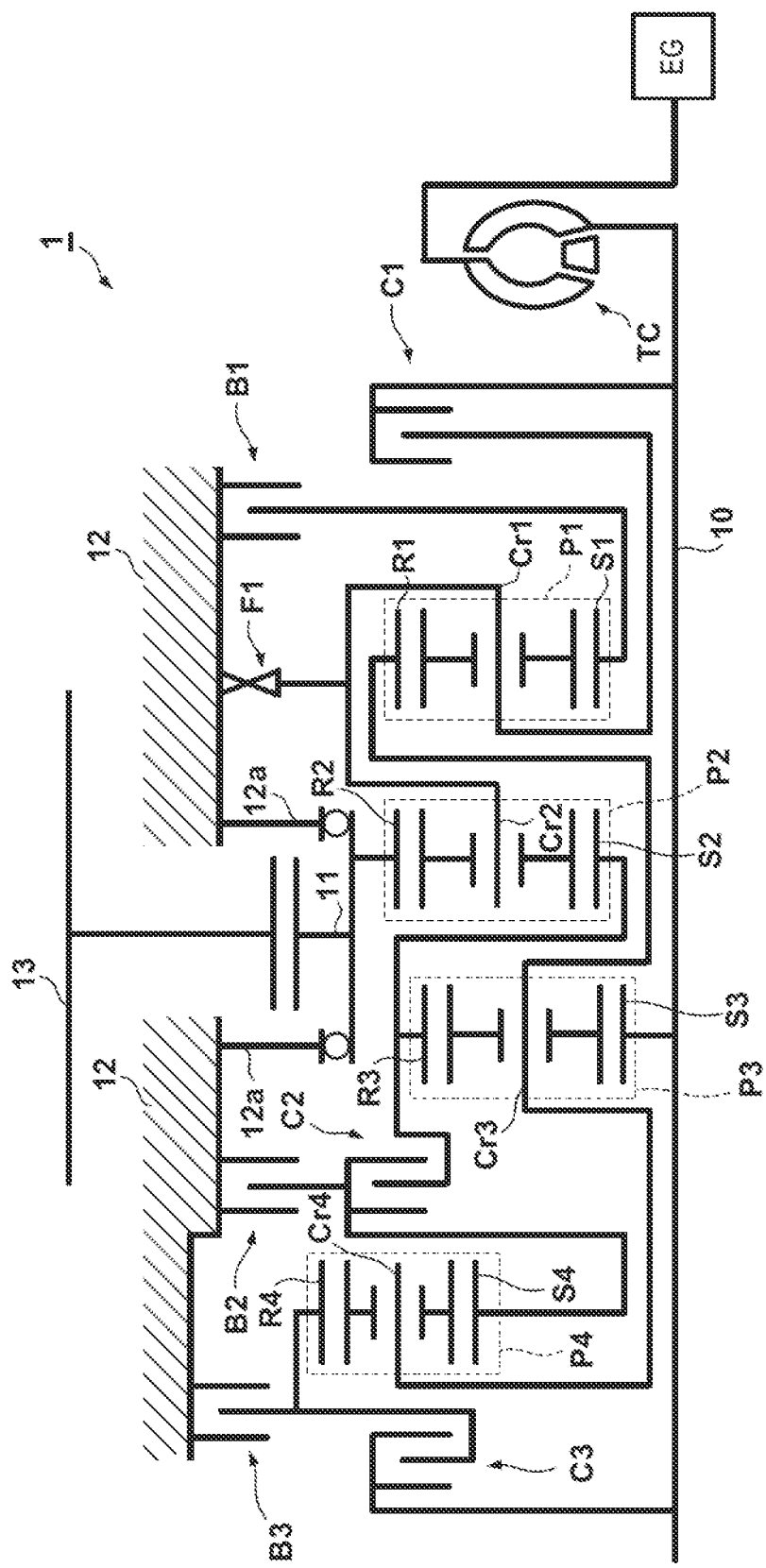
FIG. 1 is a skeleton diagram of an automatic transmission according to an embodiment of the present invention.

Hereinafter, embodiments will be described in detail with reference to the attached drawings. Note that the following embodiments are not intended to limit the scope of the claimed invention, and limitation is not made to an invention that requires all combinations of features described in the embodiments. Two or more of the multiple features described in the embodiments may be combined as appropriate. Furthermore, the same reference numerals are given to the same or similar configurations, and redundant description thereof is omitted.

FIG. 1 is a skeleton diagram of an automatic transmission 1 according to an embodiment of the present invention. Referring to FIG. 1, the automatic transmission 1 includes an input shaft 10 rotatably axially supported in a casing 12 that forms a transmission case, an output member 11 rotatably supported by support members 12a supported in the casing 12 so as to be coaxial with respect to the input shaft 10, and an output shaft (counter shaft) 13.

A driving force from an internal combustion engine EG (to be sometimes simply referred to as EG) is input to the input shaft 10, and the input shaft 10 is rotated by the driving force. A starting device is provided between the input shaft 10 and the internal combustion engine EG. Examples of the starting device are a clutch type starting device (single disc clutch, multiple disc clutch, or the like) and a hydraulic coupling type starting device (torque converter or the like). In this embodiment, a torque converter TC is provided. Hence, the driving force of the internal combustion engine EG is input to the input shaft 10 through the torque converter TC.

The output member 11 includes a gear concentric to the input shaft 10. The output shaft 13 includes a gear that meshes with the gear. The rotation of the input shaft 10 changes its speed through transmission mechanisms to be described below and is then transmitted to the output shaft 13. The rotation (driving force) of the output shaft 13 is transmitted to driving wheels through, for example, differential gears (not shown).

As the transmission mechanisms, the automatic transmission 1 includes planetary gear mechanisms P1 to P4 and engaging mechanisms C1 to C3, B1 to B3, and F1. In this embodiment, all the planetary gear mechanisms P1 to P4 are single pinion type planetary gear mechanisms. The planetary gear mechanisms P1 to P4 transmit the driving force from the input shaft 10 to the output member 11. The planetary gear mechanisms P1 to P4 can form a plurality of driving force transmission paths. The engaging mechanisms C1 to C3, B1 to B3, and F1 switch the driving force transmission paths of the planetary gear mechanisms P1 to P4, thereby establishing a plurality of gear ranges.

The planetary gear mechanisms P1 to P4 include sun gears S1 to S4, ring gears R1 to R4, and carriers Cr1 to Cr4 each supporting a pinion gear, respectively, as rotational elements (12 in total), and are disposed to be coaxial with respect to the input shaft 10.

When ordered in accordance with the arrangement order at intervals corresponding to gear ratios shown in the velocity diagram of FIG. 3 (to be described later), the sun gear S, the carrier Cr1, and the ring gear R1 of the planetary gear mechanism P1 can be referred to as a first rotational element, a second rotational element, and a third rotational element in this order.

Similarly, the ring gear R2, the carrier Cr2, and the sun gear S2 of the planetary gear mechanism P2 can be referred to as a fourth rotational element, a fifth rotational element, and a sixth rotational element in this order.

Similarly, the sun gear S3, the carrier Cr3, and the ring gear R3 of the planetary gear mechanism P3 can be referred to as a seventh rotational element, an eighth rotational element, and a ninth rotational element in this order.

Similarly, the ring gear R4, the carrier Cr4, and the sun gear S4 of the planetary gear mechanism P4 can be referred to as a 10th rotational element, a 11th rotational element, and a 12th rotational element in this order.

Each of the engaging mechanisms C1 to C3, B1 to B3, and F1 functions as a clutch or a brake. A clutch connects/disconnects the rotational elements provided in the automatic transmission 1. A brake connects/disconnects the rotational elements provided in the automatic transmission 1 to/from the casing 12. The rotational elements provided in the automatic transmission 1 include the input shaft 10 and the sun gears, ring gears, and carriers of the planetary gear mechanisms P1 to P4.

In this embodiment, the engaging mechanisms C1 to C3 are clutches, and the engaging mechanisms B1 to B3 and F1 are brakes. Hence, the engaging mechanisms C1 to C3 are sometimes called the clutches C1 to C3, and the engaging mechanisms B1 to B3 and F1 are sometimes called the brakes B1 to B3 and F1. When the engaging mechanisms C1 to C3 and B1 to B3 are switched between an engaging state (fastening state) and a release state, and the state of the engaging mechanism F1 is switched, the driving force transmission path from the input shaft 10 to the output member 11 is switched, and the plurality of gear ranges are implemented.

In this embodiment, all the engaging mechanisms C1 to C3 and B1 to B3 are assumed to be hydraulic friction engaging mechanisms. Examples of the hydraulic friction engaging mechanism are dry and wet single disc clutches and dry and wet multiple disc clutches.

The engaging mechanism F1 is provided between the casing 12 and predetermined rotational elements (here, the carriers Cr1 and Cr2 connected to each other). The engaging mechanism F1 can be switched between a one-way rotation permission state (to be sometimes referred to as OWC) in which rotation of the predetermined rotational elements (carriers Cr1 and Cr2) is restricted only in one direction, and rotation in the reverse direction is permitted and a rotation inhibition state (to be sometimes referred to as LOCK) in which the rotation is restricted in both directions.

In the one-way rotation permission state, the same function as a so-called one-way clutch is implemented. In this state, the rotational elements transmit the driving force in one rotation direction but slip in the reverse direction. In this embodiment, the engaging mechanism F1 functions as a brake. For this reason, if the engaging mechanism F1 is in the one-way rotation permission state, the predetermined rotational elements (carriers Cr1 and Cr2) are permitted to rotate only in one direction. In the rotation inhibition state, the rotational elements transmit the driving force in both rotation directions. In this embodiment, the engaging mechanism F1 functions as a brake. For this reason, if the engaging mechanism F1 is in the rotation inhibition state, the predetermined rotational elements (carriers Cr1 and Cr2) are inhibited from rotating in both directions.

An example of the structure of the engaging mechanism F1 will be described later. For example, a known two-way clutch can be employed. Some known two-way clutches can be switched between the one-way rotation permission state, the rotation inhibition state, and a two-way rotation permission state by driving control of a corresponding hydraulic actuator or electromagnetic actuator. Some known two-way clutches can further switch the one-way rotation permission state between a forward rotation permission state and a reverse rotation permission state. In this embodiment, switching between the one-way rotation permission state and the rotation inhibition state suffices, and using only the permission state in one rotation direction as the one-way rotation permission state suffices. However, a two-way clutch capable of selecting another state such as the two-way rotation permission state may be employed.

The connection relationship between the components will be described next with reference to FIG. 1.

The sun gear S3 of the planetary gear mechanism P3 is connected to the input shaft 10. The ring gear R3 is connected to the sun gear S2 of the planetary gear mechanism P2. The carrier Cr3 is connected to the ring gear R1 of the planetary gear mechanism P1 and the carrier Cr4 of the planetary gear mechanism P4. The carrier Cr2 of the planetary gear mechanism P2 is connected to the carrier Cr1 of the planetary gear mechanism P1. The ring gear R2 is connected to the output member 11. Hence, the planetary gear mechanism P2 is a planetary gear mechanism that performs driving transmission to the output shaft 13.

The clutch C1 connects the input shaft 10 to the carrier Cr1 of the planetary gear mechanism P1 and the carrier Cr2 connected to the carrier Cr1 in the engaging state, and disconnects them in the release state. Note that the release state will sometimes be referred to as a disengaging state. The clutch C2 connects the ring gear R3 of the planetary gear mechanism P3 to the sun gear S4 of the planetary gear mechanism P4 in the engaging state, and disconnects them in the release state. The clutch C3 connects the input shaft 10 to the ring gear R4 of the planetary gear mechanism P4 in the engaging state, and disconnects them in the release state.

The brake B1 connects the casing 12 to the sun gear S1 of the planetary gear mechanism P1 in the engaging state, and disconnects them in the release state. The brake B2 connects the casing 12 to the sun gear S4 of the planetary gear mechanism P4 in the engaging state, and disconnects them in the release state. The brake B3 connects the casing 12 to the ring gear R4 of the planetary gear mechanism P4 in the engaging state, and disconnects them in the release state.

As already described, the brake F1 restricts the rotation of the carrier Cr2 of the planetary gear mechanism P2 (and the carrier Cr1 connected to the carrier Cr2) only in one direction in the one-way rotation permission state, and fixes the carrier Cr2 of the planetary gear mechanism P2 (and the carrier Cr1 connected to the carrier Cr2) to the casing 12 in the rotation inhibition state.

FIG. 2A is an engagement table (fastening table) showing the engaging combination of the engaging mechanisms provided in the automatic transmission 1. FIG. 2B shows the gear ratios of the planetary gear mechanisms provided in the automatic transmission 1. FIG. 3 is a velocity diagram of the automatic transmission 1. "Gear ratio" in FIG. 2A indicates the gear ratio between the input shaft 10 and the output member 11.

In this embodiment, 10 forward ranges or gears (1st to 10th) and one reverse range or gear (RVS) can be established. "P/N" represents non-running ranges; "P", a parking range; and "N", a neutral range. "RPM" represents an engaging combination in RVS preparation processing (to be described later). In this processing, the brake F1 is switched from the one-way rotation permission state to the rotation inhibition state.

In the example of the engagement table shown in FIG. 2A, "○" indicates the engaging state, and no mark indicates the release state. Note that engaging mechanisms that are set in the engaging state for smooth change to adjacent gear ranges are displayed as "○", although the engagement is not essential to establish the gear ranges.

As for the brake F1, "○" indicates the rotation inhibition state, and "Δ" indicates the one-way rotation permission state. In the 1st gear (1st), the brake F1 can be set in either the rotation inhibition state or the one-way rotation permission state, but it is normally set in the one-way rotation permission state, and the rotation inhibition state is selected when enabling the engine brake.

In the non-running ranges (P/N), the state of the brake F1 can be either the rotation inhibition state or the one-way rotation permission state. In this embodiment, the state before a change to the non-running ranges (P/N) is inherited.

In the 2nd gear (2nd) to the 10th gear (10th), the brake F1 is set in the one-way rotation permission state, but slips because of the structure of the automatic transmission 1. For this reason, the state of the brake F1 is indicated by "(Δ)". If the brake F1 is a mechanical engaging mechanism capable of selecting the above-described two-way rotation permission state, the brake F1 can also be set in the two-way rotation permission state in the 2nd gear (2nd) to the 10th gear (10th).

Figure 3:
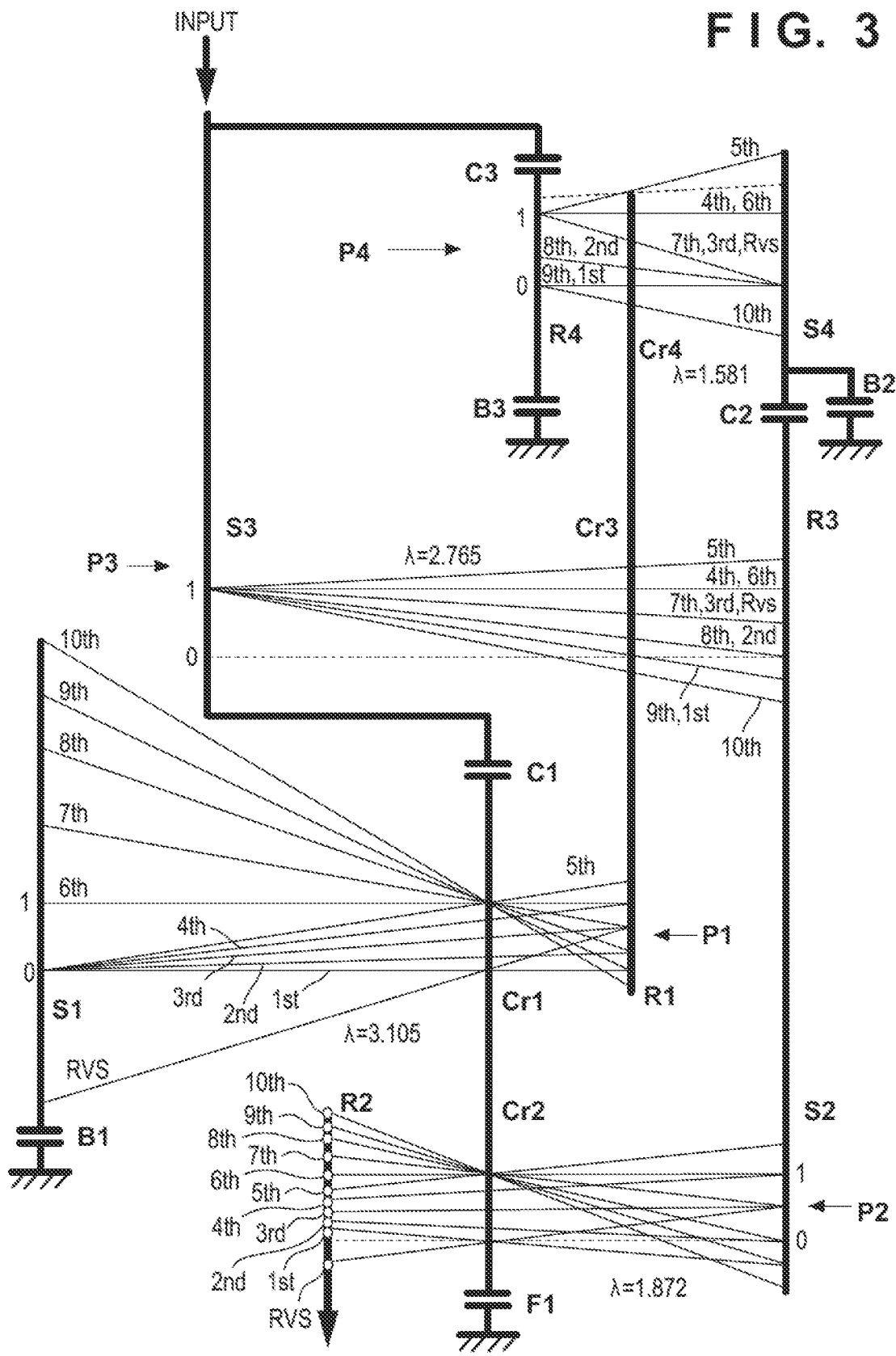
FIG. 3 is a velocity diagram of the automatic transmission shown in FIG. 1.

The velocity diagram of FIG. 3 shows the rotation velocity ratio of each element to the input to the input shaft 10 in each gear range. The ordinate represents the velocity ratio. "1" indicates the same rotation speed as the input shaft 10, and "0" indicates a stop state. The abscissa is based on the gear ratio between the rotational elements of the planetary gear mechanisms P1 to P4. λ is the gear ratio between a carrier Cr and a sun gear S. Note that in FIG. 3, elements corresponding to the output shaft 13 are not illustrated.

Control Apparatus

Figure 4B:
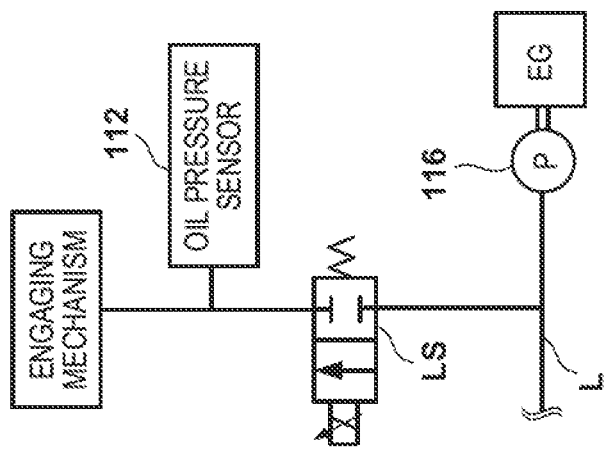
FIG. 4B is a view showing an example of the disposition of an oil pressure sensor.
Figure 4A:
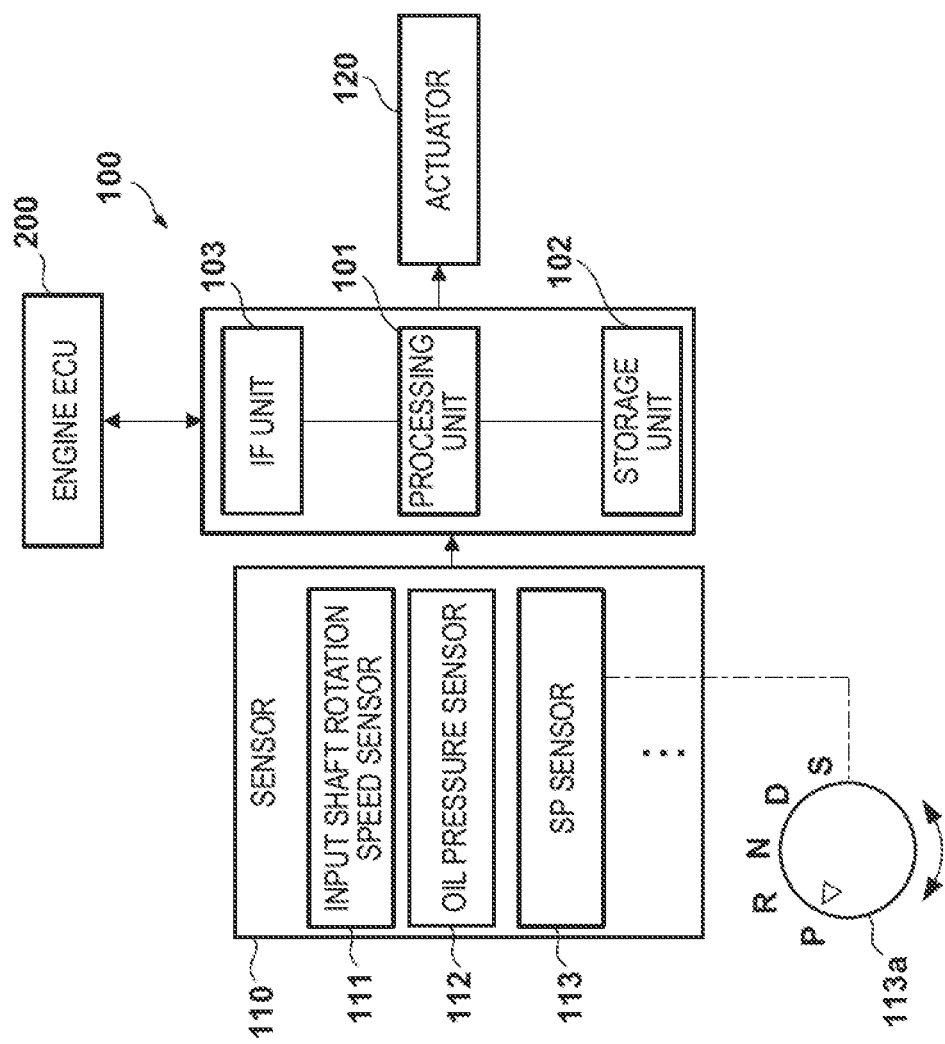
FIG. 4A is a block diagram showing an example of the control apparatus of the automatic transmission shown in FIG. 1.

FIG. 4A is a block diagram of a control apparatus 100 of the automatic transmission 1. The control apparatus 100 can control not only the automatic transmission 1 but also the internal combustion engine EG and the torque converter TC. In this embodiment, the internal combustion engine EG is assumed to be controlled by an engine ECU 200 provided independently of the control apparatus 100. The control apparatus 100 can receive various kinds of information of the internal combustion engine EG and the vehicle from the engine ECU 200. The various kinds of information can include the driving force (output torque) of the internal combustion engine EG. The control apparatus 100 can also transmit the information of the automatic transmission 1 to the engine ECU 200.

The control apparatus 100 includes a processing unit 101 such as a CPU, a storage unit 102 such as a RAM and ROM, and an I/F unit 103 that interfaces the processing unit 101 and an external device or the engine ECU 200. The I/F unit 103 is formed from, for example, a communication interface, an input/output interface, or the like.

The processing unit 101 executes a program stored in the storage unit 102 and controls various kinds of actuators 120 based on the detection results of various kinds of sensors 110.

The various kinds of sensors 110 include various kinds of sensors provided in the automatic transmission 1. FIG. 4A illustrates the following sensors. An input shaft rotation speed sensor 111 is a sensor that detects the rotation speed (rotation velocity) of the input shaft 10. An oil pressure sensor 112 includes a sensor that detects the oil pressure of hydraulic oil of each of the engaging mechanisms C1 to C3 and B1 to B3. An SP sensor (shift position sensor) 113 is a sensor that detects a shift range (shift position) selected by the driver. Five types of shift ranges, that is, P range (parking range), R range (reverse range), N range (neutral range), D range (forward range), and S range (sports range) are assumed as the shift ranges.

If the D range is selected, the processing unit 101 selects one of the 1st gear (1st) to the 10th gear (10th) in accordance with a gear change map stored in the storage unit 102 and changes the gear. If the S range is selected, the processing unit 101 selects one of the 1st gear (1st) to the 10th gear (10th) in accordance with a gear change map different from the gear change map for the D range, and changes the gear. If the R range is selected, the processing unit 101 selects the reverse range.

In this embodiment, the occupant can switch the shift range by rotating a dial 113a. The shift range switching order has been determined in the rotation direction of the dial 113a. For example, if the dial 113a is rotated clockwise while the P range is selected, the shift range is switched in the order of P→R→N→D→S. If the occupant tries to select the D range from the P range, each of the R range and the N range, which is passed through in the middle of the rotation of the dial 113a, is recognized as selected in terms of control, but instantaneously switched. The switching processing to each of the R range and the N range is interrupted, so that the occupant will feel as if the P range is directly switched to the D range.

The various kinds of actuators 120 include various kinds of actuators provided in the automatic transmission 1. For example, the actuators 120 include an electromagnetic actuator such as an electromagnetic solenoid that switches the operation state of each of the engaging mechanisms C1 to C3, B1 to B3, and F1.

FIG. 4B shows an example of the disposition of the oil pressure sensor 112. For example, the oil pressure sensor 112 can be provided for each of the engaging mechanisms C1 to C3 and B1 to B3. This makes it possible to detect the oil pressure of hydraulic oil of each engaging mechanism. Note that the oil pressure sensor 112 need not always be provided for each engaging mechanism.

A solenoid valve LS that supplies the hydraulic oil is assigned to each engaging mechanism. Engagement and release (disengagement) of each engaging mechanism can be switched by opening or blocking a supply line L of the hydraulic oil by the solenoid valve LS. The oil pressure sensor 112 is provided so as to receive the hydraulic oil supplied from the solenoid valve LS to the engaging mechanism. The detection result of the oil pressure sensor 112 indicates the oil pressure of the hydraulic oil supplied to the engaging mechanism. The hydraulic oil is pressure-fed to the supply line L by an oil pump 116 driven by the internal combustion engine EG.

LOCK Switching Control of Brake F1

In this embodiment, the brake F1 is in the rotation inhibition state in the reverse range. When switching from the forward range or non-running range to the reverse range, the brake F1 is sometimes switched from the one-way rotation permission state to the rotation inhibition state. At this time, to reduce unusual noise or vibration, the difference between the rotation speed of the brake F1 on the side of the casing 12 and that on the side of the carrier Cr2 is preferably 0. In other words, it is preferable that the rotation of the carrier Cr2 is stopped (the rotation speed of the carrier Cr2 is 0).

To do this, a combination of engaging mechanisms that changes the rotation speed of the carrier Cr2 to 0 intervenes. In this embodiment, there is no sensor for directly measuring the rotation speed of the carrier Cr2. For this reason, the carrier Cr2 and the input shaft 10 are connected, and it is confirmed from the detection result of the input shaft rotation speed sensor 111 or the like that the rotation speed of the carrier Cr2 is 0. After that, the brake F1 is switched to the rotation inhibition state.

FIG. 5 shows, as an example, the engaging combination of engaging mechanisms when switching the gear range from the D range (1st forward gear is in selection) to the R range passing through the N range. When the gear range is the 1st forward gear, the brakes B1 and B2 are in the engaging state, as shown in FIG. 2A. The brake F1 is assumed to be in the one-way rotation permission state.

First, as indicated by step 1 in FIG. 5, the brakes B1 and B2 are controlled to the release state. When release of the brakes B1 and B2 is completed, the process advances to step 2.

In step 2, the clutches C1 and C3 and the brake B3 engage. The ring gear R2 and the output shaft 13 are rotatable, and the driving wheels can freely rotate. It is therefore possible to avoid an unexpected behavior of the vehicle.

As is apparent from the velocity diagram of FIG. 3, when the clutch C3 and the brake B3 engage, the input shaft 10 is fixed to the casing 12. When the clutch C1 engages, the carrier Cr2 is connected to the input shaft 10.

Note that in this embodiment, step 2 is performed next to step 1. However, step 1 and step 2 may be performed simultaneously. More specifically, while performing control to set the brakes B1 and B2 in the release state, control to engage the clutches C1 and C3 and the brake B3 may be performed. This can improve responsiveness when switching the gear range to the reverse range.

If predetermined conditions are met, the process advances to step 3. The predetermined conditions are conditions to confirm that the rotation speed of the carrier Cr2 is 0. Basically, the conditions are completion of engagement of the clutch C1 and detection result of input shaft rotation speed sensor 111<predetermined value (for example, a value that can be regarded as 0). As for the completion of engagement of the clutch C1, for example, when the detection result of the oil pressure sensor 112 of the clutch C1 indicates a predetermined oil pressure or when the control amount of the solenoid valve LS for the clutch C1 reaches a predetermined value, it can be determined that engagement is completed. The same determination method can be employed even for completion of engagement of other engaging mechanisms.

In step 3, the brake F1 is switched from the one-way rotation permission state to the rotation inhibition state. Since the difference between the rotation speed of the brake F1 on the side of the casing 12 and that on the side of the carrier Cr2 is 0, occurrence of unusual noise or vibration can be avoided. When switching of the brake F1 is completed, the process advances to step 4. In step 4, the clutch C1 and the brake B3 are released, and the brake B2 engages. The combination for the reverse range thus holds (FIG. 2A).

In some cases, the processing of steps 2 and 3 is called RVS preparation processing, and the processing of step 4 is called RVS in-gear processing. In terms of control, when step 1 is completed, an RVS preparation mode is set as the control state of the gear range. When the RVS preparation mode is set, RVS preparation processing is performed. In addition, when step 3 is completed, an RVS in-gear mode is set as the control state of the gear range. When the RVS in-gear mode is set, RVS in-gear processing is performed. Such mode setting is managed by, for example, providing a mode information storage area in the storage unit 102.

An example of processing executed by the processing unit 101 concerning the contents of control shown in FIG. 5 will be described with reference to FIGS. 6A and 6B.

Figure 6A:
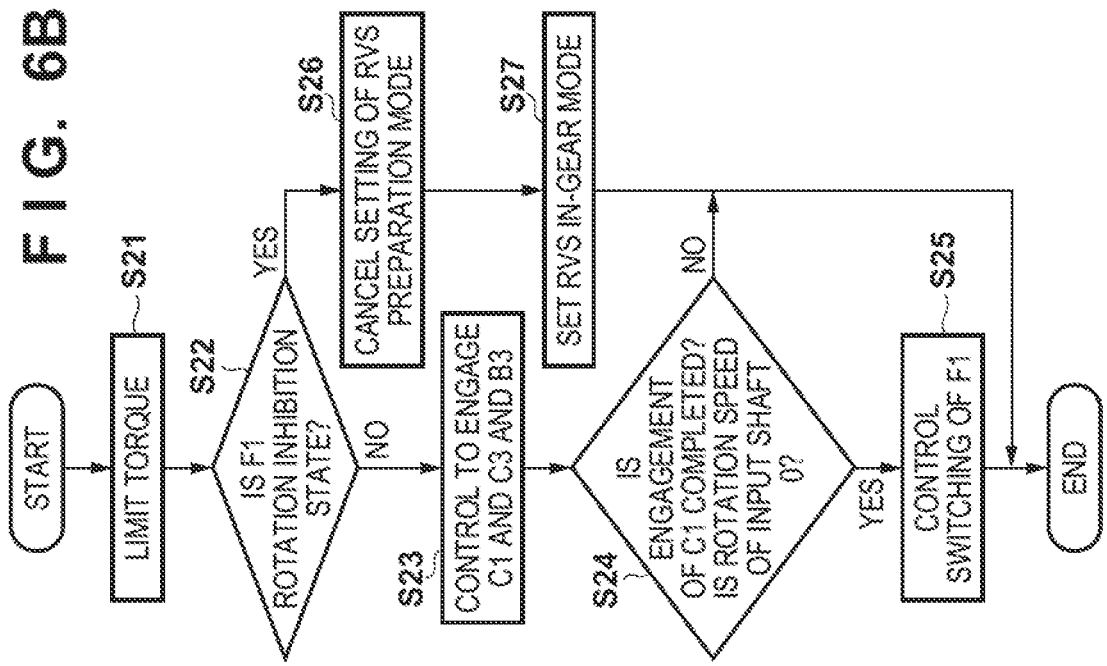
FIGS. 6A and 6B are flowcharts showing an example of processing of the control apparatus shown in FIG. 4A.

FIG. 6A will be referred to. In step S11, it is determined whether a condition to switch the brake F1 from the one-way rotation permission state to the rotation inhibition state is met. If YES in step S11, the process advances to step S12. Otherwise, the process advances to step S14. In this embodiment, if the brake F1 is in the one-way rotation permission state, and the SP sensor 113 detects that the occupant has switched the shift range from another range to the R range, it is determined that the condition is met. Switching to the R range includes passing through the R range. For example, if the occupant rotates the dial 113a to select the D range from the P range, the R range is passed through. In this case of passing through the R range, the processing unit 101 also recognizes that the R range is selected (albeit for a moment).

In step S12, the engaging mechanisms (for example, the brakes B1 and B2) in the engaging state are released, as described in step 1 shown in FIG. 5. As in a case of switching from the P range or the N range to the R range, if no engaging mechanism is in the engaging state, the process advances to next processing. In step S13, the RVS preparation mode is set as the control mode. After that, the process advances to step S15.

In step S14, it is determined whether the RVS preparation mode is set. If YES in step S14, the process advances to step S15. Otherwise, the process advances to step S16. In step S15, RVS preparation processing is performed. Details will be described later. In step S16, another process is performed, and the processing of one unit ends.

Figure 6B:
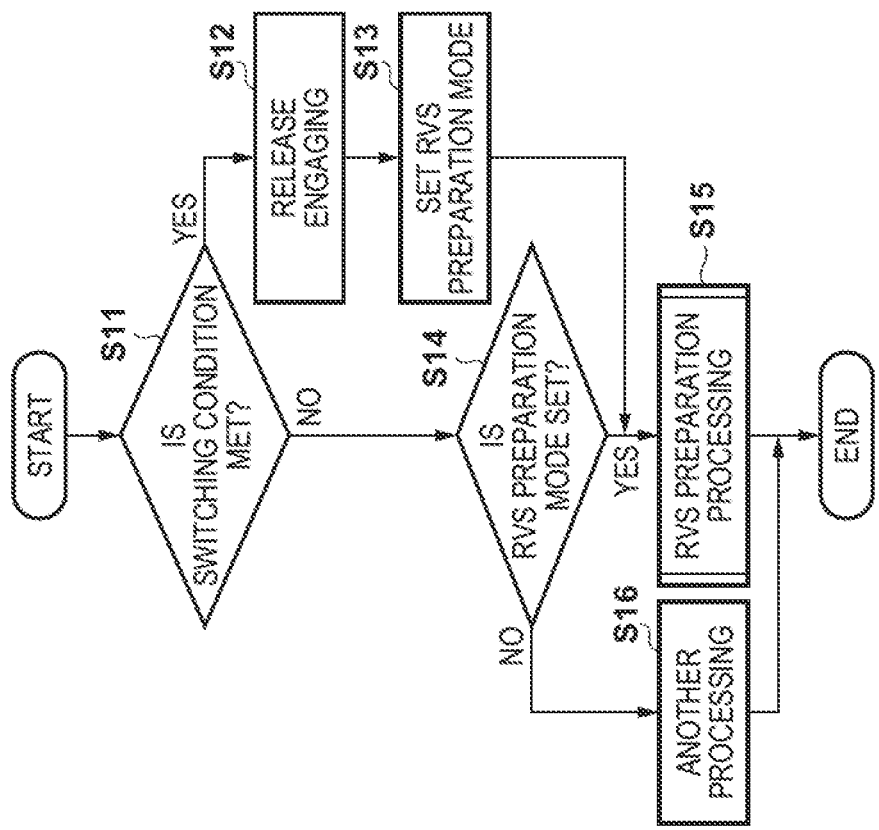

FIG. 6B will be referred to. FIG. 6B is a flowchart showing RVS preparation processing of step S15. In step S21, torque limitation of the driving source of the automatic transmission 1 is executed. For example, the output of the internal combustion engine EG is reduced within the range in which the necessary oil pressures of the engaging mechanisms and the like are ensured.

In step S22, it is determined whether switching of the brake F1 to the rotation inhibition state is completed. If YES in step S22, the process advances to step S26. Otherwise, the process advances to step S23.

In step S23, control to engage the clutches C1 and C3 and the brake B3 starts, as described in step 2 shown in FIG. 5. The clutches C1 and C3 and the brake B3 can be engaged by increasing the control amounts to the solenoid valves LS of these engaging mechanisms stepwise. When the process of step S23 is repeated a plurality of times, the engagement is completed.

In step S24, it is determined whether engagement of the clutch C1 is completed, and the rotation speed of the input shaft 10 is 0, as described in step 2 shown in FIG. 5. If all the conditions are met, the process advances to step S25. If not all the conditions are met, the processing of one unit ends.

In step S25, the state of the brake F1 is switched to the rotation inhibition state, as described in step 3 shown in FIG. 5. Since the switching is done in a state in which the difference between the rotation speed of the brake F1 on the side of the casing 12 and that on the side of the carrier Cr2 is 0, it is possible to prevent occurrence of unusual noise or vibration and avoid breakage of the brake F1.

In step S26, setting of the RVS preparation mode is canceled. In step S27, the RVS in-gear mode is set. With this setting, processing of releasing the clutch C1 and the brake B3 and engaging the brake B2 is performed, as described in step 4 shown in FIG. 5, in another routine (for example, step S16 in FIG. 6A). The processing thus ends.

Figure 7:
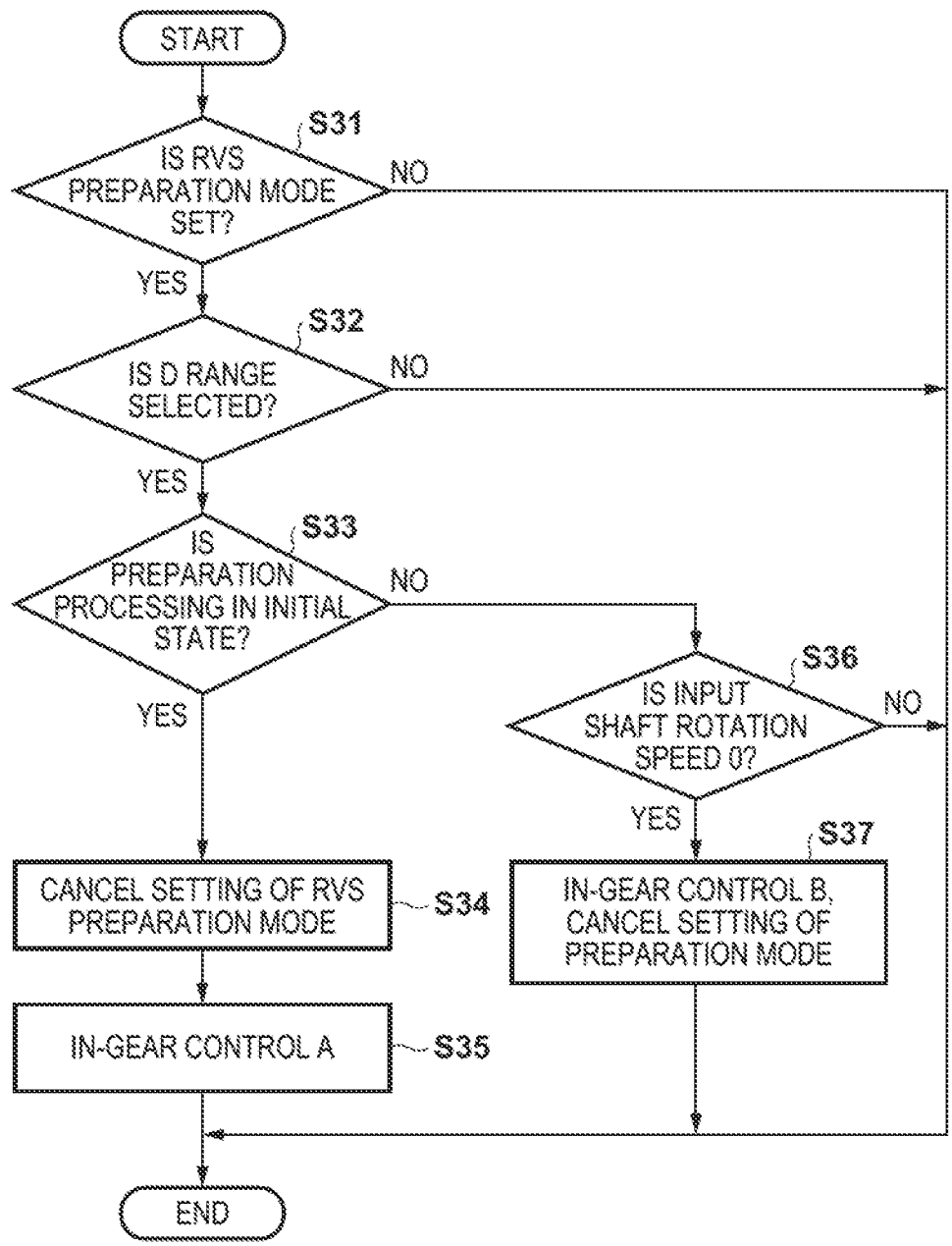
FIG. 7 is a flowchart showing another example of processing of the control apparatus shown in FIG. 4A.

Next, an example of processing in a case in which the shift range is switched from the R range to the D range in the middle of the RVS preparation processing (before switching control of F1 in step S25) will be described. Such a state can occur, for example, by passing through the R range when the occupant rotates the dial 113a from the P range to select the D range. In this case, if the gear range (1st gear in this embodiment) of the D range is put in gear after completing the RVS preparation processing, it may take time to start the vehicle. On the other hand, since the RVS preparation processing is processing of stopping the rotation of the input shaft 10, if it is tried to put the gear range of the D range in gear while immediately interrupting the RVS preparation processing, unusual noise may occur or it may take time to put the gear range in gear depending on the rotation state of the input shaft 10. Therefore, in this embodiment, the gear range of the D range is put in gear following a procedure that differs depending on a degree of progress of the RVS preparation processing. FIG. 7 is a flowchart showing an example of the processing.

In step S31, it is determined whether the RVS preparation mode is set. If YES in step S31, the process advances to step S32. Otherwise, the processing of one unit ends. In step S32, based on the detection result of the SP sensor 113, it is determined whether the D range is selected. If the D range is selected, the process advances to step S33. If the D range is not selected, the processing of one unit ends.

Processing in steps S33 to S37 is processing of selecting, depending on the progress of the RVS preparation processing, control for putting the gear range of the D range in gear. In this embodiment, the RVS preparation processing is divided into an initial state and a subsequent stage before the switching control of F1 in step S25, and either one of in-gear control A and in-gear control B is selected.

In the initial stage of the RVS preparation processing, the input shaft 10 is rotating with almost no deceleration. The load on the automatic transmission 1 is low, and almost no shock is generated even if the engaging mechanism is released. On the other hand, in a state in which the rotation of the input shaft 10 is stopped, a load is applied on the automatic transmission 1 by the output of the internal combustion engine EG, but since the rotation of each rotational element provided in the automatic transmission 1 is stopped or almost stopped, almost no shock is generated even if the engaging mechanism is suddenly engaged. In consideration of characteristics as described above, either one of the in-gear control A and the in-gear control B is selected.

In step S33, it is determined whether the RVS preparation processing is in the initial state. If YES in step S33, the process advances to step S34. Otherwise, the process advances to step S36. The initial stage is a stage in which, for example, the rotation reduction rate (current rotation speed/initial rotation speed×100) of the input shaft 10 falls within a predetermined range. The predetermined range is, for example, a range of not higher than 3% or a range not higher than 5%. Further, the initial stage is, for example, a stage in which the elapsed time since the RVS preparation processing is started falls within a predetermined range. The predetermined range is, for example, a range of not longer than 0.5 sec. Furthermore, the initial stage is, for example, a stage in which the oil pressure of each of the engaging mechanisms C1, C3, and B3 to be engaged in the RVS preparation processing is equal to or smaller than a predetermined value.

In step S34, setting of the RVS preparation mode is canceled, and the in-gear control A is started in step S35. In step S36, it is determined whether the rotation of the input shaft 10 is stopped. For example, if detection result of input shaft rotation speed sensor 111<predetermined value (for example, a value that can be regarded as 0) holds, it is determined that the rotation of the input shaft 10 is stopped. If YES in step S36, the process advances to step S37. Otherwise, in order to continue the RVS preparation processing until the rotation of the input shaft 10 stops, the processing of one unit ends. In step S37, the in-gear control B is started, and setting of the RVS preparation mode is canceled (cancellation of the RVS preparation processing is started).

Figure 8:
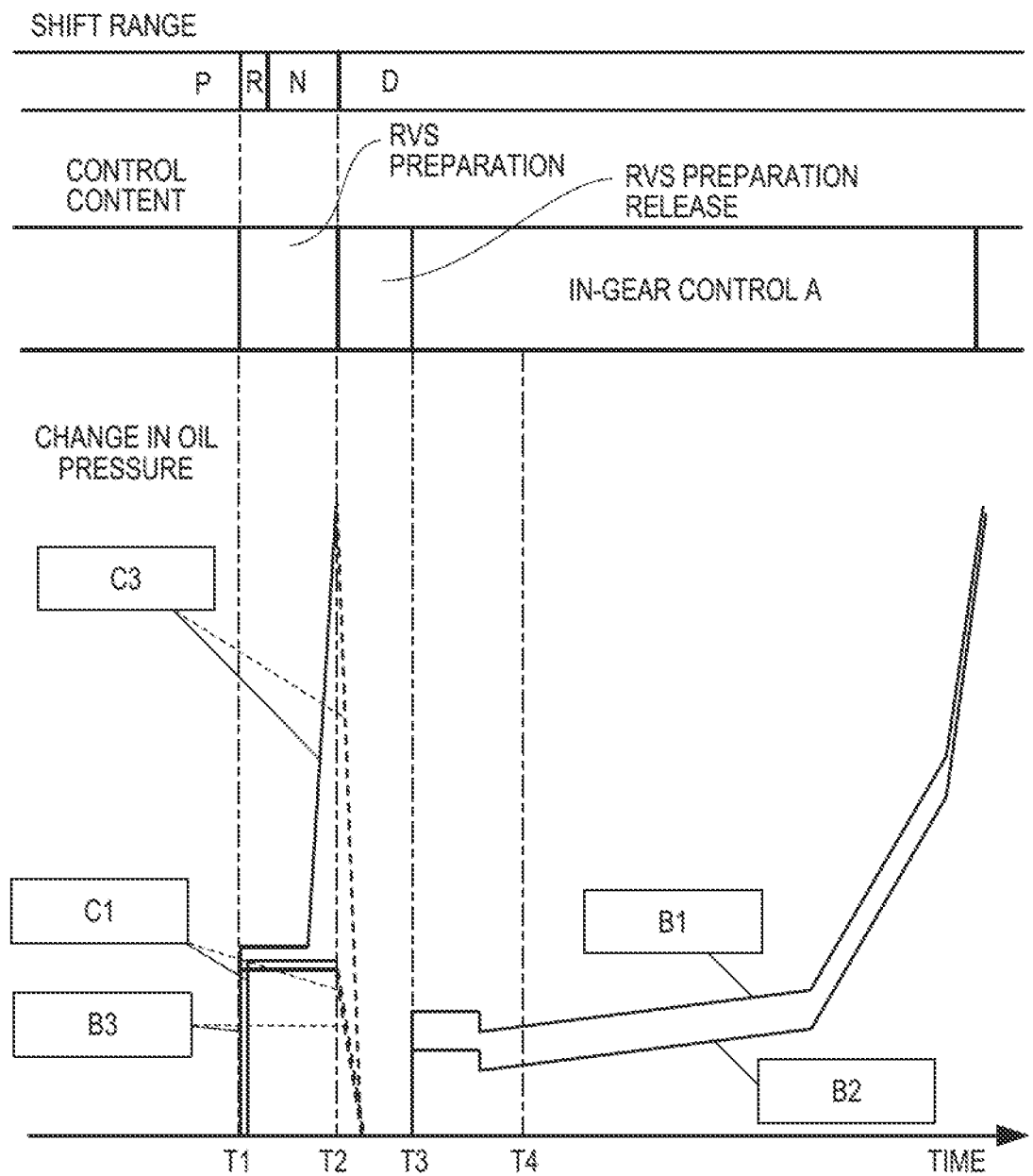
FIG. 8 is an explanatory view of in-gear control A.

FIG. 8 is a state transition diagram showing an example of the in-gear control A. An example of temporal changes in shift range, control content, and degree of engagement (oil pressure) of each engaging mechanism is schematically shown. As for the change in oil pressure, the solid line represents the change in the engaging state, and the broken line represents the change in the release state. When the shift range is switched from the P range to the R range, the RVS preparation processing is started (time T1), and engagement of the clutches C1 and C3 and the brake B3 is started. At time T2, the shift range is switched to the D range. Since the RVS preparation processing is in the initial stage, the RVS preparation processing is interrupted and the in-gear control A is executed.

In the initial stage of the RVS preparation processing, as has been described above, the input shaft 10 is rotating with almost no deceleration, and the load on the automatic transmission 1 is low. Therefore, before the in-gear control A, the RVS preparation processing is canceled and the clutches C1 and C3 and the brake B3 are immediately released. Even if they are immediately released, almost no shock is generated, so that occurrence of unusual noise or vibration can be avoided. When release of the clutches C1 and C3 and the brake B3 is completed, the in-gear control A is executed, and engagement of the brakes B1 and B2 is started to establish the engaging combination corresponding to the 1st gear (time T3). Completion of release of the clutches C1 and C3 and the brake B3 can be determined from, for example, the detection result of the oil sensor 112. At time T4, engagement of the brake B1 proceeds to the extent that a forward driving force is generated in the vehicle.

Figure 9:
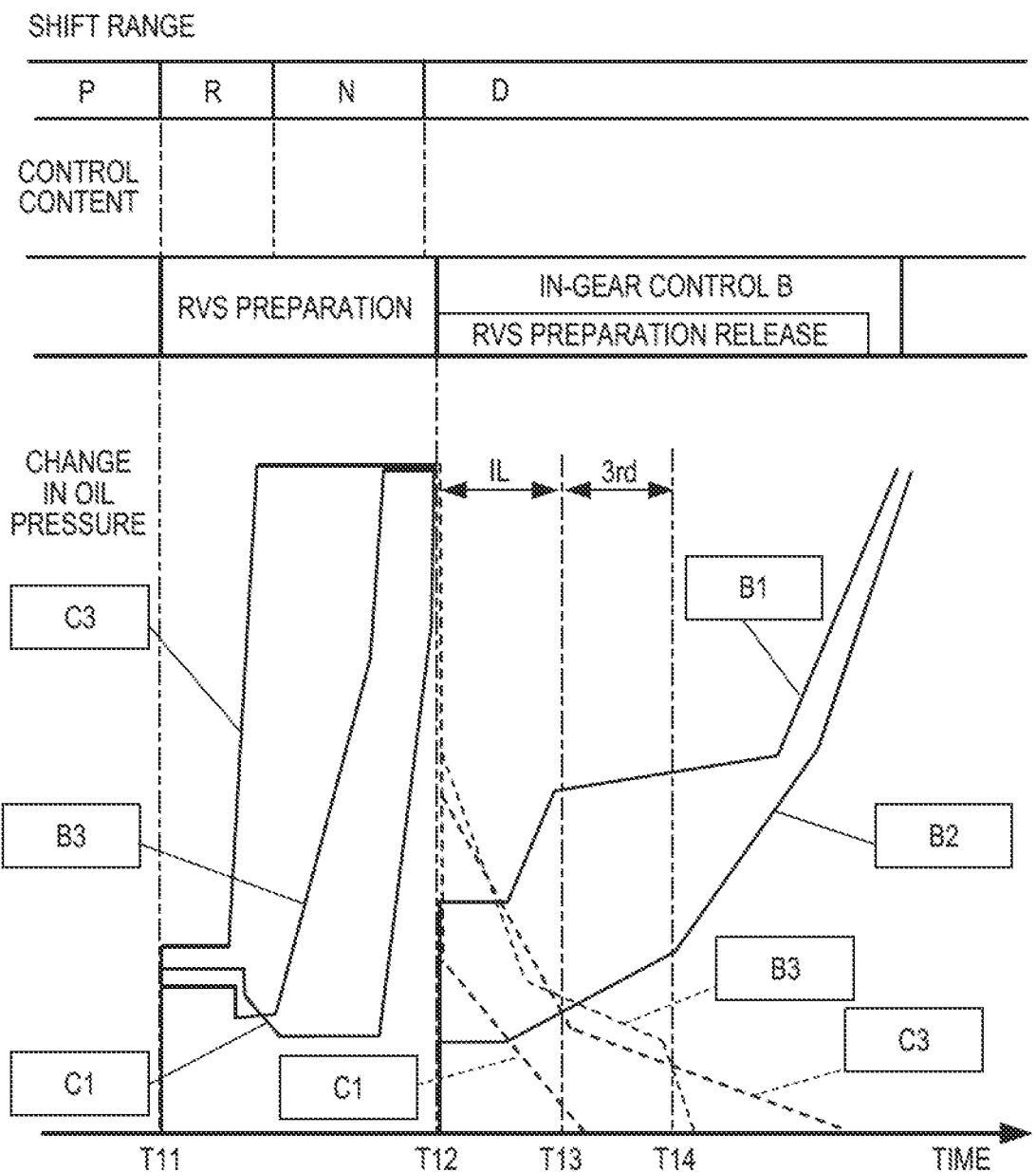
FIG. 9 is an explanatory view of in-gear control B.

FIG. 9 is a state transition diagram showing an example of the in-gear control B. When the shift range is switched from the P range to the R range, the RVS preparation processing is started (time T11), and engagement of the clutches C1 and C3 and the brake B3 is started. Thereafter, the shift range is switched to the D range. The elapsed time of the RVS preparation processing is longer and the processing is more advanced than in the example shown in FIG. 8. Since the RVS preparation processing has passed the initial stage, the in-gear control B is executed after the rotation of the input shaft 10 stops (time T12).

In the in-gear control B, in order to establish the engaging combination corresponding to the 1st gear, engagement of the brakes B1 and B2 is started. Since the rotation of the input shaft 10 stops, the rotation of each rotational element provided in the automatic transmission 1 is stopped or almost stopped. Accordingly, almost no shock is generated even if the brakes B1 and B2 are suddenly engaged. Therefore, in the in-gear control B, the pressure of the supplied oil rises faster than in the in-gear control A shown in FIG. 8, and the brakes B1 and B2 are suddenly engaged.

In parallel with starting engagement of the brakes B1 and B2, release of the clutches C1 and C3 and the brake B3 is started. At this time, it is controlled such that, in terms of the capacity change of the clutch, the RVS preparation processing is canceled after the forward range is put in gear. That is, by overlapping the period in which the brake whose engagement is started exerts the engaging force and the period in which the clutches and the brake whose engagement is released exert the engaging force, it is controlled such that the brakes B1 and B2 are engaged while the rotation of the input shaft 10 stops.

As a result, interlock (IL) is temporarily generated in the automatic transmission 1 (time T12 to time T13). When release of the clutches C1 and C3 and the brake B3 is completed, a forward driving force is generated in the vehicle, but the shaft element of the automatic transmission 1 may be twisted during the interlock, and this may cause a slight shock when the vehicle is started. In order to suppress generation of the shock, when executing the in-gear control B, the clutches C1 and C3 and the brake B3 are released more slowly upon canceling the RVS preparation processing than in the in-gear control A.

Further, in this embodiment, in order to suppress generation of the shock, the order of completing the release of the clutches C1 and C3 and the brake B3 is set such that the 1st gear is established after the gear range on the higher speed side than the 1st gear is established. Here, the gear range on the higher speed side is the 3rd gear. The 3rd gear is established by engagement of the brakes B1 and B2 and the clutch C3 (FIG. 2A). By delaying completion of release of the clutch C3, the 3rd gear is established in the period from time T13 to time T14. With this operation, it is possible to decrease the starting acceleration of the vehicle slower, and generation of the shock can be suppressed. Note that the gear range on the higher speed side is not limited to the 3rd gear. This depends on the overlap between the engaging mechanisms to be engaged in the RVS preparation processing and the engaging mechanisms in the gear range on the higher speed side and the 1st gear.

When release of the clutch C1 is completed at time T13, the interlock is eliminated, and a forward driving force is generated in the vehicle. In the starting stage of the vehicle, it travels in the 3rd gear only for a short time and, when the 1st gear is established thereafter, it travels in the 1st gear.

As has been described above, according to this embodiment, it becomes possible to start the vehicle with improved responsiveness to switching of the shift range to the D range during the RVS preparation processing while suppressing the shock. Note that when switching of the brake F1 to LOCK has been completed or is started, normal switching control to the D range (in-gear to the 1st gear) may be executed after completion of switching to LOCK, and this does not let the occupant feel a decrease in responsiveness.

Summary of Embodiment

The above embodiment discloses at least control apparatuses described below.

1. A control apparatus (100) according to the above embodiment is a control apparatus of an automatic transmission (1), wherein the automatic transmission includes an input shaft (10) to which a driving force is input from a driving source (EG) through a torque converter (TC), an output member (11), a plurality of planetary gear mechanisms (P1-P4) configured to transmit the driving force input to the input shaft to the output member, and a plurality of engaging mechanisms (C1-C3, B1-B3, F1) capable of establishing a plurality of gear ranges by switching a transmission path of the driving force in the plurality of planetary gear mechanisms, one of the plurality of engaging mechanisms is a mechanical engaging mechanism (F1) functioning as a brake, the mechanical engaging mechanism can be switched to a first state (OWC) in which rotation of a predetermined rotational element (Cr1, Cr2) only in a first direction is permitted and a second state (LOCK) in which rotation of the predetermined rotational element in both the first direction and a second direction reverse to the first direction is restricted, in a reverse range, the mechanical engaging mechanism is set in the second state, the control apparatus comprises a control unit (101) configured to control engagement and release of the plurality of engaging mechanisms, if a shift range is switched to the reverse range when the mechanical engaging mechanism is in the first state, the control unit starts engagement of the engaging mechanism corresponding to the reverse range (S27) after executing preparation processing (S15), the preparation processing is processing of switching the mechanical engaging mechanism from the first state to the second state via an engaging combination (C1, C3, B3) which connects the predetermined rotational element to the input shaft to stop rotation of the input shaft (S23-S25), and if the shift range is switched from the reverse range to a forward range in the middle of the preparation processing, the control unit establishes a predetermined forward gear range (S31-S37) by controlling the plurality of engaging mechanisms following a procedure that differs depending on a degree of progress of the preparation processing.

According to this embodiment, it is possible to provide a control apparatus of an automatic transmission that can cope with switching of the shift range during preparation processing.

2. In the control apparatus (100) according to the above embodiment, if the shift range is switched from the reserve range to the forward range in the middle of the preparation processing, in a stage in which the rotation of the predetermined rotational element stops, the control unit starts engagement of the engaging mechanism corresponding to the predetermined forward gear range and starts release of the engaging mechanisms set in an engaging state in the engaging combination (S37, FIG. 9).

According to this embodiment, by utilizing that the rotation of the input shaft connected to the predetermined rotational element stops, it is possible to put the engaging mechanism corresponding to the predetermined forward gear range in gear at an early stage. Thus, the vehicle start responsiveness can be improved.

3. In the control apparatus (100) according to the above embodiment, some engaging mechanisms (C1, C3, B3) engage in the engaging combination, when engagement of the engaging mechanism corresponding to the predetermined forward gear range is started and release of the some engaging mechanisms engaging in the engaging combination is started, interlock (IL) is generated, and after the release is started, the order of completing the release of the some engaging mechanisms in the engaging combination is set such that the predetermined forward gear range (1st) is established after a gear range (3rd) on a higher speed side than the predetermined forward gear range is established (FIG. 9).

According to this embodiment, it is possible to suppress the shock at the time of starting the vehicle, which is caused by the generation of interlock.

4. In the control apparatus (100) according to the above embodiment, if the shift range is switched from the reserve range to the forward range in the middle of the preparation processing, and the preparation processing is in an initial stage, the control unit starts engagement of the engaging mechanism corresponding to the predetermined forward gear range (S35, FIG. 8) after releasing the engaging mechanisms (C1, C3, B3) set in an engaging state in the engaging combination.

According to this embodiment, by utilizing that a load on the automatic transmission is low, it is possible to interrupt the preparation processing at an early stage and start engagement of the predetermined forward gear range. Thus, the vehicle start responsiveness can be improved.

5. In the control apparatus (100) according to the above embodiment, if the shift range is switched from the reverse range to the forward range in the middle of the preparation processing, in an initial stage of the preparation processing, the control unit starts engagement of the engaging mechanism corresponding to the predetermined forward gear range after releasing the engaging mechanisms set in an engaging state in the engaging combination, in a stage of the preparation processing between the initial stage and a stop of rotation of the predetermined rotational element, the control unit waits until the rotation of the predetermined rotational element stops, and in a stage in which the rotation of the predetermined rotational element stops, the control unit starts engagement of the engaging mechanism corresponding to the predetermined forward gear range and starts release of the engaging mechanisms set in the engaging state in the engaging combination.

According to this embodiment, in the initial stage of the preparation processing, by utilizing that a load on the automatic transmission is low, it is possible to interrupt the preparation processing at an early stage and start engagement of the predetermined forward gear range. Thus, the vehicle start responsiveness can be improved. Further, if the preparation processing is after the initial stage, by utilizing that the rotation of the input shaft connected to the predetermined rotational element stops, it is possible to put the engaging mechanism corresponding to the predetermined forward gear range in gear at an early stage. Thus, the vehicle start responsiveness can be improved.

6. In the control apparatus (100) according to the above embodiment, the plurality of engaging mechanisms other than the mechanical engaging mechanism are hydraulic friction engaging mechanisms, and more sudden engagement is executed in a case of starting engagement of the engaging mechanism corresponding to the predetermined forward gear range in the stage in which the rotation of the predetermined rotational element stops than in a case of starting engagement of the engaging mechanism corresponding to the predetermined forward gear range in the initial stage of the preparation processing (FIG. 8, FIG. 9).

According to this embodiment, it is possible to improve the vehicle start responsiveness after the initial stage of the preparation processing.

The invention is not limited to the foregoing embodiments, and various variations/changes are possible within the spirit of the invention.

What is claimed is:

1. A control apparatus of an automatic transmission, wherein the automatic transmission includes:
an input shaft to which a driving force is input from a driving source through a torque converter;
an output member;
a plurality of planetary gear mechanisms configured to transmit the driving force input to the input shaft to the output member; and
a plurality of engaging mechanisms capable of establishing a plurality of gear ranges by switching a transmission path of the driving force in the plurality of planetary gear mechanisms,
one of the plurality of engaging mechanisms is a mechanical engaging mechanism functioning as a brake,
the mechanical engaging mechanism can be switched to a first state in which rotation of a predetermined rotational element only in a first direction is permitted and a second state in which rotation of the predetermined rotational element in both the first direction and a second direction reverse to the first direction is restricted,
in a reverse range, the mechanical engaging mechanism is set in the second state,
the control apparatus comprises a control unit configured to control engagement and release of the plurality of engaging mechanisms,
if a shift range is switched to the reverse range when the mechanical engaging mechanism is in the first state, the control unit starts engagement of the engaging mechanism corresponding to the reverse range after executing preparation processing,
the preparation processing is processing of switching the mechanical engaging mechanism from the first state to the second state via an engaging combination which connects the predetermined rotational element to the input shaft to stop rotation of the input shaft, and
if the shift range is switched from the reverse range to a forward range in the middle of the preparation processing, the control unit establishes a predetermined forward gear range by controlling the plurality engaging mechanisms following a procedure that differs depending on a degree of progress of the preparation processing.

2. The apparatus according to claim 1, wherein
if the shift range is switched from the reserve range to the forward range in the middle of the preparation processing, in a stage in which the rotation of the predetermined rotational element stops, the control unit starts engagement of the engaging mechanism corresponding to the predetermined forward gear range and starts release of the engaging mechanisms set in an engaging state in the engaging combination.

3. The apparatus according to claim 2, wherein
some engaging mechanisms engage in the engaging combination,
when engagement of the engaging mechanism corresponding to the predetermined forward gear range is started and release of the some engaging mechanisms engaging in the engaging combination is started, interlock is generated, and
after the release is started, the order of completing the release of the some engaging mechanisms in the engaging combination is set such that the predetermined forward gear range is established after a gear range on a higher speed side than the predetermined forward gear range is established.

4. The apparatus according to claim 1, wherein
if the shift range is switched from the reserve range to the forward range in the middle of the preparation processing, and the preparation processing is in an initial stage, the control unit starts engagement of the engaging mechanism corresponding to the predetermined forward gear range after releasing the engaging mechanisms set in an engaging state in the engaging combination.

5. The apparatus according to claim 1, wherein
if the shift range is switched from the reverse range to the forward range in the middle of the preparation processing,
in an initial stage of the preparation processing, the control unit starts engagement of the engaging mechanism corresponding to the predetermined forward gear range after releasing the engaging mechanisms set in an engaging state in the engaging combination,
in a stage of the preparation processing between the initial stage and a stop of rotation of the predetermined rotational element, the control unit waits until the rotation of the predetermined rotational element stops, and
in a stage in which the rotation of the predetermined rotational element stops, the control unit starts engagement of the engaging mechanism corresponding to the predetermined forward gear range and starts release of the engaging mechanisms set in the engaging state in the engaging combination.

6. The apparatus according to claim 5, wherein
the plurality of engaging mechanisms other than the mechanical engaging mechanism are hydraulic friction engaging mechanisms, and
more sudden engagement is executed in a case of starting engagement of the engaging mechanism corresponding to the predetermined forward gear range in the stage in which the rotation of the predetermined rotational element stops than in a case of starting engagement of the engaging mechanism corresponding to the predetermined forward gear range in the initial stage of the preparation processing.

* * * * *